(12) United States Patent
Menonna et al.

(10) Patent No.: US 10,471,550 B2
(45) Date of Patent: Nov. 12, 2019

(54) DEVICE FOR POSITIONING A NUMBER OF ELEMENTS

(71) Applicants: Mahle International GmbH, Stuttgart (DE); Maschinenbau-Service-Automatisierungstechnik Chemnitz GmbH, Chemnitz (DE)

(72) Inventors: Antonio Menonna, Ditzingen (DE); Stefan Morgenstern, Niederwiesa (DE); Roland Schacherer, Geisingen (DE)

(73) Assignees: MAHLE INTERNATIONAL GMBH (DE); MASCHINENBAU-SERVICE-AUTOMATISIERUNGSTECHNIK CHEMNITZ GMBH (DE)

( * ) Notice: Subject to any disclaimer, the term of this patent is extended or adjusted under 35 U.S.C. 154(b) by 486 days.

(21) Appl. No.: 15/334,805

(22) Filed: Oct. 26, 2016

(65) Prior Publication Data

US 2017/0113307 A1 Apr. 27, 2017

(30) Foreign Application Priority Data

Oct. 27, 2015 (DE) .......................... 10 2015 220 977

(51) Int. Cl.
*B23K 37/00* (2006.01)
*B23K 37/04* (2006.01)
(Continued)

(52) U.S. Cl.
CPC ...... *B23K 37/0426* (2013.01); *B23K 37/0452* (2013.01); *B23P 11/025* (2013.01);
(Continued)

(58) Field of Classification Search
CPC ............ B23K 37/0426; B23K 37/0452; B23K 2101/005; B23K 37/04–0538;
(Continued)

(56) References Cited

U.S. PATENT DOCUMENTS 4,827,585 A * 5/1989 Nakamura ............... F01L 1/047
29/421.1
5,195,239 A * 3/1993 Breuer ................... B21D 26/14
29/468

(Continued)

FOREIGN PATENT DOCUMENTS

DE 102008064194 A1 7/2010
DE 102013215711 A1 2/2015
(Continued)

OTHER PUBLICATIONS

English translation Abstract of DE 102014211565.
(Continued)

*Primary Examiner* — Kiley S Stoner
(74) *Attorney, Agent, or Firm* — Fishman Stewart PLLC

(57) ABSTRACT

A device for positioning a number of function elements, each having a recess for a shaft, in a predetermined angle position on the shaft, may include a plurality of support balconies arranged one above the other, each being destined for a function element. A movable guide carriage may be configured to enable the shaft to be push the shaft from above through the recesses of the function elements. The support balconies may each include at least one gripper respectively fixing one function element. The at least one gripper may be arranged on an associated gripper carriage and may be adjustable in an x-direction and a y-direction relative to the associated gripper carriage and the support balcony. The associated gripper carriage may be mounted on the support balcony so as to be rotatable about a z-axis.

16 Claims, 2 Drawing Sheets

(51) Int. Cl.
  *B23P 11/02* (2006.01)
  *F01L 1/047* (2006.01)
  *B23K 101/00* (2006.01)

(52) U.S. Cl.
  CPC ........ *F01L 1/047* (2013.01); *B23K 2101/005* (2018.08); *B23P 2700/02* (2013.01); *F01L 2001/0471* (2013.01); *F01L 2001/0475* (2013.01); *F01L 2103/01* (2013.01)

(58) Field of Classification Search
  CPC ............... F01L 1/047; F01L 2001/0475; F01L 2103/01; F01L 2001/0471; B23P 11/025; B23P 2700/02; B21D 19/10; B21D 21/00; B23Q 7/10
  USPC .......... 228/212–213, 44.3–49.6; 219/121.58, 219/158–161
  See application file for complete search history.

(56) References Cited

U.S. PATENT DOCUMENTS

| | | | | |
|---|---|---|---|---|
| 5,603,446 | A * | 2/1997 | Kikuchi | B23K 20/004 228/6.2 |
| 5,664,463 | A * | 9/1997 | Amborn | B21D 53/845 74/567 |
| 2002/0101595 | A1* | 8/2002 | Johnson | G01B 11/245 356/602 |
| 2008/0060406 | A1* | 3/2008 | Yamanaka | B21D 53/845 72/353.2 |
| 2015/0192040 | A1* | 7/2015 | Schuler | F01L 1/026 74/567 |
| 2015/0308299 | A1* | 10/2015 | Dautel | F01L 1/053 123/195 C |
| 2015/0360331 | A1* | 12/2015 | Beerens | F16H 25/16 29/447 |
| 2016/0108764 | A1* | 4/2016 | Leutert | F01L 1/047 123/90.6 |
| 2016/0271742 | A1* | 9/2016 | Dautel | F01L 1/047 |
| 2017/0113309 | A1 | 4/2017 | Menonna et al. | |
| 2017/0312804 | A1* | 11/2017 | Lindner | B21D 53/845 |

FOREIGN PATENT DOCUMENTS

| | | |
|---|---|---|
| DE | 102014211565 A1 | 12/2015 |
| DE | 102015220979 A1 | 4/2017 |
| JP | 55100883 A * | 8/1980 |
| JP | 2000061749 A | 2/2000 |
| JP | 2015230042 A | 12/2015 |
| WO | 2012079656 A1 | 6/2012 |
| WO | 2014/111472 A1 | 7/2014 |

OTHER PUBLICATIONS

English Abstract for JP-2015230042.
Search Report for corresponding EP 16 19 7734 dated Feb. 21, 2018.
English abstract for DE-102008064194.
German Patent Office Action dated Sep. 27, 2017 for German Patent Application No. DE 10 2015 220 977.

* cited by examiner

DEVICE FOR POSITIONING A NUMBER OF ELEMENTS

CROSS-REFERENCE TO RELATED APPLICATIONS

This application claims priority to German Patent Application No. DE 10 2105 220 977.6, filed on Oct. 27, 2015, the contents of which are hereby incorporated by reference in its entirety.

TECHNICAL FIELD

The present invention relates to a device for positioning a number of function elements each having a recess for a shaft, on the shaft. The invention also relates to a method for the thermal joining of such function elements on such a shaft using such a device.

BACKGROUND

In order to join function elements, in particular cams, on a shaft, in particular on a cam shaft pipe, the hubs or recesses of individual function elements must be aligned with the axis of the shaft. If a number of function elements are to be joined simultaneously in one go by inserting the shaft, all function elements must be aligned accordingly.

The DE 10 2008 064 194 A1 has disclosed a device suitable for positioning a number of function elements, in particular cams, having a recess for a shaft, in a predetermined angular position on the shaft, wherein the device comprises a number of holders, each destined for one function element. The holders can be positioned in such a way that the recesses of the function elements extend essentially along a common straight.

A further device for positioning a number of function elements having a recess for a shaft, in particular cams, on the shaft has been disclosed in the JP 2000-61749 A.

SUMMARY

The present invention is engaged in the problem of proposing a device for positioning a number of function elements having a recess for a shaft, which in particular renders assembly of the function elements on the shaft during thermal joining distinctly more precise.

According to the invention this problem is solved by the subject of the independent claims. Advantageous embodiments are the subject of the dependent claims.

The present invention is based on the general idea to provide, on a device known as such for the positioning of a number of function elements such as cams, balancing masses, gears and/or bearings, on the shaft in a predetermined angle position, wherein each function element comprises a recess for a shaft, a number of support balconies arranged one above the other each having a gripper means for fixing a function element, wherein these gripper means are each arranged on an associated gripper carriage and possess a degree of freedom in x-direction and y-direction, i.e. in a preferably horizontal plane, thereby making it easier to join them on the shaft because individual function elements can be at least marginally deflected, in particular as regards any possible positional inaccuracies. Moreover, according to the invention, at least one gripper carriage is mounted on the support balcony so as to be rotatable about a z-axis, i.e. about a vertical axis. This makes it possible to fix the function element fixed in the respective associated gripper means in almost any random rotary angle position. To this end a circular-segment-like guide contour may, for example, be provided on the associated support balcony, wherein a circle centre of the guide contour lies in an axis of the recess of the function element to be joined, so that shifting the gripper carriage in the guide contour causes twisting of the function element about its axis. Twisting of the gripper carriage thus does not lead to the respective function element being deflected away from its later rotational axis/joining axis. Moreover the device comprises a movable guide carriage for the shaft so that the shaft can be inserted, in particular from above, through the recess of the function elements, wherein the insertion operation can be distinctly simplified due to the existing degrees of freedom of the gripper means in x-direction and y-direction and thus also the function elements. According to the invention each support balcony comprises a gripper means for fixing one function element respectively, wherein this gripper means is arranged on an associated gripper carriage and is adjustably mounted in x-direction and y-direction relative to the associated gripper carriage and thus to the associated support balcony. A device of this kind offers the special advantage that the individual function elements can be initially deposited on the associated support balcony and fixed by the gripper means. At this stage a preliminary alignment has already been achieved as regards a coaxiality of the individual recesses of the function elements. The individual function elements are then heated or have already been heated, wherein additionally or alternatively the shaft can be cooled. Subsequently a centring rod is pushed from below through the recess of the individual function elements, until it makes contact with the shaft, for example by means of a centring tip, thus aligning the shaft for the joining operation. The shaft can then be pushed from above by means of the movable guide carriage through the recess of the function element. Using the device according to the invention, a number of function elements such as cams, balancing masses, gears and/or bearings, each comprising a recess for a shaft, can thus be fixed in a predetermined angle position on the shaft, for example by means of thermal joining.

With an advantageous further development of the invention a pushing means is provided on at least one support balcony, in particular on all support balconies, wherein the at least one pushing means is configured such that it can adjust the gripper means and in addition also the function element, at least in x-direction relative to the gripper carriage. In this way it is possible, following threading of the function elements onto the shaft, to press each of them by means of the respective pushing means at least in x-direction against the shaft, thereby achieving a uniform cooling down of the function elements previously heated during thermal joining. With the aid of the pushing means the gripper means can be adjusted at least in x-direction relative to the gripper carriage. The shaft can be pushed in from above by means of the movable guide carriage through the recesses of the function elements, wherein following the pushing-in, the individual pushing means shift the respective gripper means relative to the associated gripper carriage at least in x-direction and fix them there, until temperature compensation fixing the guide elements on the shaft has been achieved. Due to the subsequent shifting of the individual function elements at least in x-direction, a particularly uniform cooling of the previously heated function elements on the shaft can be achieved.

With an advantageous further development of the solution according to the invention the gripper means is mounted about a y-axis, i.e. about a horizontal axis, tiltable on the gripper carriage. In this way a possibility for tilting the gripper means is created, which in particular, makes it easier to remove the finished control shaft from the device according to the invention.

Conveniently at least one gripper carriage is rotatably mounted about a z-axis, i.e. about a vertical axis on the support balcony. This makes it possible to fix the function element fixed in the respectively associated gripper means in almost any random rotary angle position. A circular-segment-like guide contour may be provided on, for example, the associated support balcony, wherein a circle centre of the guide contour lies in an axis of the recess of the function element to be joined, so that moving the guide carriage in the guide contour causes twisting of the function element about its axis. Twisting of the gripper carriage therefore does not lead to the reflective function element being deflected from its later rotary axis/joining axis.

With a further advantageous embodiment of the solution according to the invention the pushing means is configured such that it shifts the gripper means exclusively in x-direction. It is, of course, also feasible for the pushing means to shift the gripper means additionally in y-direction or an oblique direction, wherein, in order to simplify construction, shiftability may be limited exclusively to the x-direction. A hydraulic or pneumatic cylinder or an eccentric element may be provided as pushing means, which due to a rotational movement causes a shift of the gripper means.

With a further advantageous embodiment of the solution according to the invention the gripper carriage is fixed relative to the support balcony in z-direction. Additionally or alternatively the gripper means may also be fixed relative to the gripper carriage in z-direction. This may be a means of ensuring that each of the function elements to be joined on the shaft can be joined in an exactly predefined axial position on the shaft, the position being defined by the respective axial position or height position of the individual support balconies. Therefore, if the support balconies have been accurately set as regards their height, the axially correct position of the function elements on the shaft can be determined, insofar as the guide carriage moving the shaft can also be accurately controlled as regards its vertical pushing-in movement.

With a further advantageous embodiment of the solution according to the invention the gripper means comprises two gripper jaws, which allow holding the function element to be fixed in a single or in a random rotary angle position. If the function element is held in a single rotary angle position provision may be made for the gripper means to have two gripper jaws, which comprise an inner contour complementary to the outer contour of the function element to be fixed. If individual function elements with different rotary angle positions are to be fixed on the respective shafts, the individual gripper jaws may be configured accordingly.

The present invention is further based on the general idea of proposing a method for the thermal joining of function elements such as cams, balancing masses, gear and/or bearings, each comprising a recess, to a shaft by means of the previously named device for manufacturing a control shaft, in which initially the individual function elements are placed into the support balconies arranged one above the other and aligned and fixed relative to their rotary angle position. At this stage however, the individual function elements still possess two degrees of freedom as regards the x-direction and as regards the y-direction, i.e. within a horizontal plane, so that they can be at least marginally shifted within the horizontal plane. This allows a corresponding deflection when inserting the shaft, wherein it is possible to avoid an extremely exact alignment combined with the associated stringent constructional requirements, as is known to be necessary with previous devices known from the art. Subsequently a centring rod is pushed from below through the recess of the individual function elements, until it makes contact with the shaft. Alignment of the shaft by means of the centring rod may take place, for example, via a centring tip arranged on the centring rod, which tip engages in the shaft. The function elements were previously heated or are now heated in the support balcony, wherein additionally or alternatively the shaft can be cooled. At this stage the shaft can then be inserted from above by means of the movable guide carriage through the recesses of the function elements, wherein following insertion the respective pushing means shift the respectively associated gripper means relative to the respectively associated gripper carriage at least in x-direction, and in this position temperature compensation is awaited which fixes the guide elements on the shaft. Due to the gripper means being shifted by the respectively associated pushing means, an improved cooling process/thermal joining process can be achieved, because the shifting operation can be used as a means for enforcing a particularly uniform cooling process/a particularly uniform temperature compensation process. Following temperature compensation which fixes the guide elements on the shaft the control shaft finished in this way can be withdrawn from the device.

Using the device according to the invention a temperature compensation process and thus a thermal joining process can be improved, as a result of which the quality of control shafts manufactured in this way can be distinctly improved. In addition a special advantage consists in that the individual function elements, when the shaft is pushed through their recesses, comprise a degree of freedom in x-direction and y-direction, which allows the alignment process, which up till now had to be particularly accurate in order to prevent cocking of the shaft, to be bypassed or avoided.

Further important features and advantages of the invention are revealed in the sub-claims, the drawings and the associated description of the figures with reference to the drawings.

It is understood that the above mentioned features and those still to be explained in more detail below can be used not only in the respectively cited combination but also in other combinations or on their own, without leaving the scope of the invention. Preferred exemplary embodiments of the invention are depicted in the drawings and will now be explained in more detail in the description below, wherein identical reference symbols refer to identical or similar or functionally identical components.

BRIEF DESCRIPTION OF THE DRAWINGS

In the schematically drawn figures

DETAILED DESCRIPTION

Figure 3:
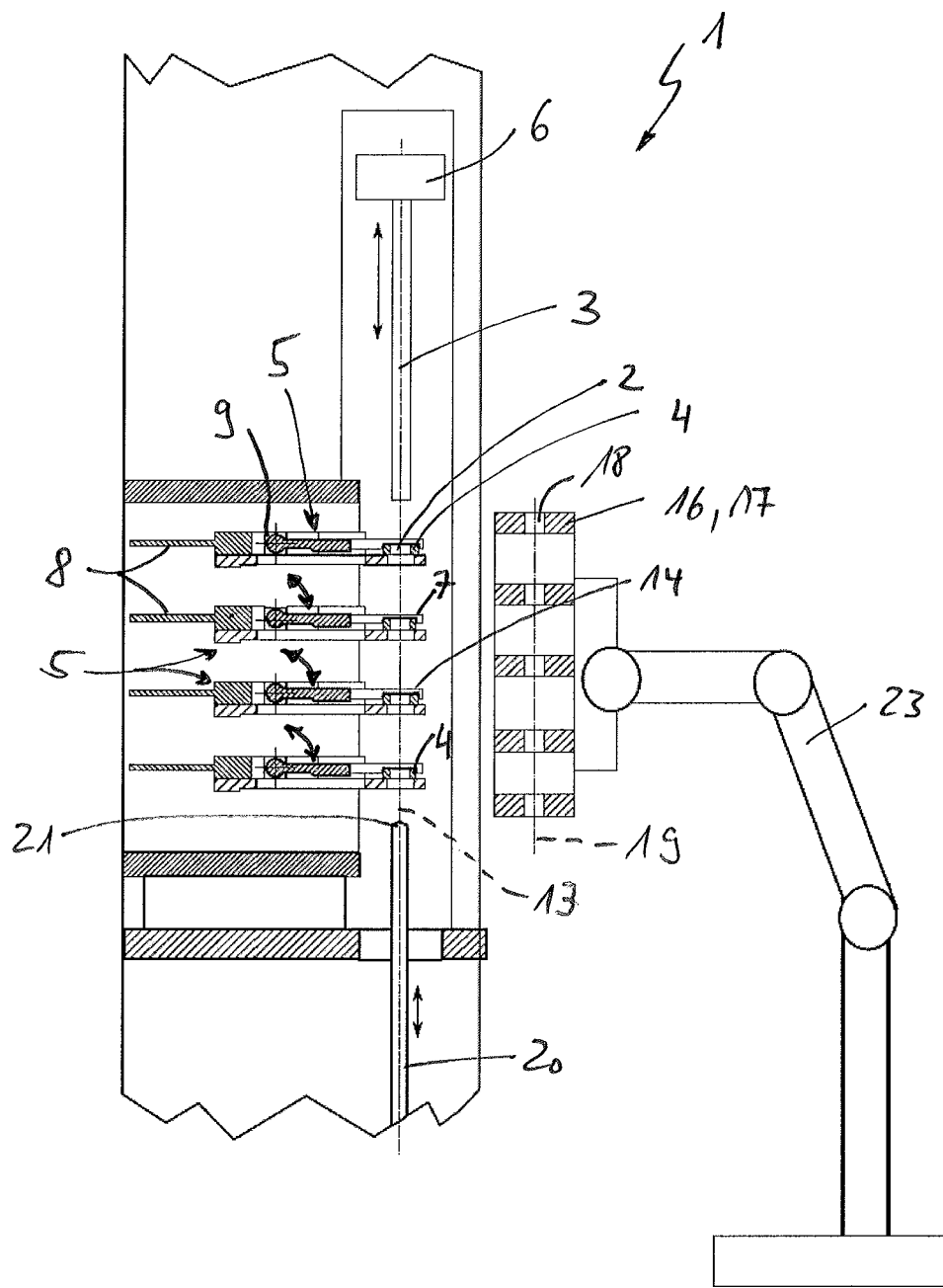
FIG. 3 shows a section through the device according to the invention.

According to FIG. 3 the device 1 according to the invention for positioning a number of function elements 4 such as cams, balancing masses, gear and/or bearings, each comprising a recess 2, in a predetermined angular position of the shaft 3, comprises a number of support balconies 5 each destined for one function element 4 (see also FIG. 1), which are arranged one above the other, in particular vertically one above the other. Further, a movable guide carriage 6 is provided for the shaft 3, so that the shaft 3 can be inserted in particular from above through the recesses 2 of the individual function elements 4. Insertion of the shaft 3 from above is very advantageous in that alignment of the shaft 3 occurs automatically due to gravity.

Figure 1:
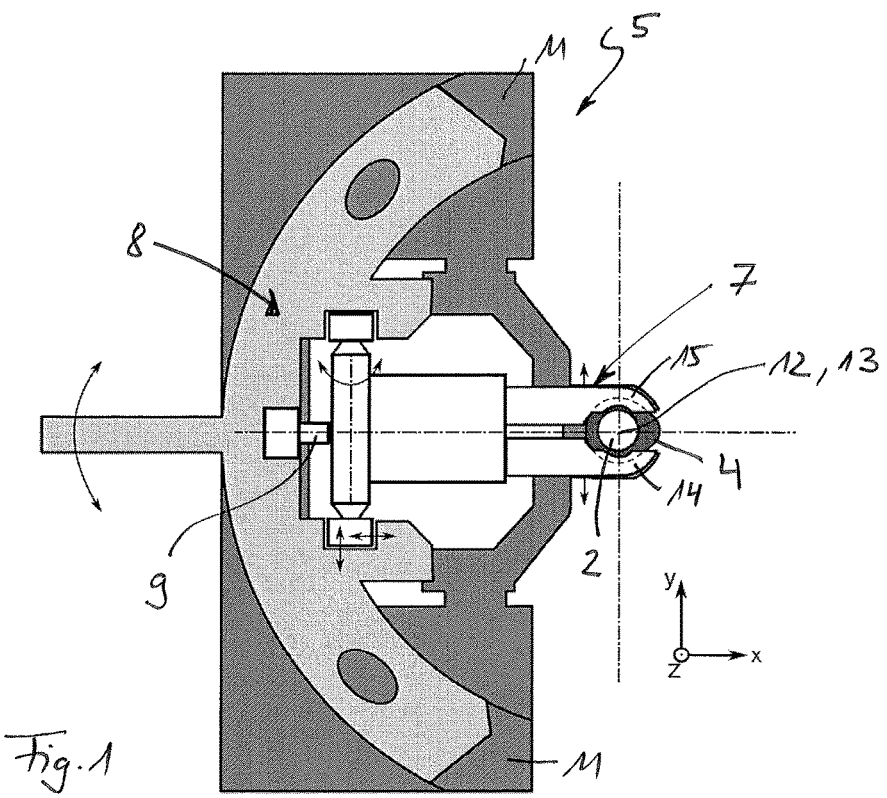
FIG. 1 shows a detail of a device according to the invention depicted in FIG. 3, in the vicinity of a support balcony.

The support balconies 5, of which one is shown enlarged in FIG. 1, are the essential feature of the invention with the inventive device 1, and this will now be discussed:

At least one support balcony 5, preferably all support balconies 5, each comprise a gripper means 7 for fixing a function element 4 respectively, such as a cam. The gripper means 7 is arranged on an associated gripper carriage 8 and is adjustably mounted in relation to the same in x-direction and in y-direction (in the image plane in FIG. 1), i.e. in a horizontal plane. Via this mounting it is thus possible to allow to the gripper means 7 and thus also to the function elements 4 gripped by them, two degrees of freedom, i.e. in x-direction and in y-direction, which means that a joining of the function elements 4 on the shaft 3, i.e. a pushing-through of the shaft 3 through the recesses 2 of the function elements 4 requires distinctly less preliminary alignment of the individual function elements 4, since these are able to compensate for minor positional deviations, if any, due to the degrees of freedom. In addition a pushing means 9 is provided on the support balcony 5 shown in FIG. 1, which is configured such that it can shift the gripper means 7 and via the gripper means 7 also the function element 4 at least in x-direction relative to the gripper carriage 8. In other words, the pushing means 9 is arranged on the gripper carriage 8 and impacts on the gripper means 7. This pushing means 9 makes it possible to shift the individual function elements 4, following their threading onto the shaft 3, at least in x-direction and thereby achieve a more uniform cooling operation.

On further regarding FIG. 1 it can be recognised that the gripper means 7 is tiltably mounted about a y-axis on the gripper carriage 8, which in particular makes it easier to remove the finished control shaft 10 such as a camshaft from the device 1. The control shaft 10 consists of a shaft 3 and the function elements 4 thermally joined on it.

At least one of the gripper carriages 8, preferably all gripper carriages 8, are rotatably mounted about a z-axis on the associated support balcony 5, wherein the z-axis represents a vertical axis and in FIG. 1 extends vertically to the image plane. The x-axis and the y-axis describe the image plane. The z-axis of the at least one gripper carriage 8 is aligned in parallel to the axis of the movable guide carriage 6.

In the support balcony 5 a circular-segment-like guide contour 11 is provided, wherein a circle centre 12 of the guide contour 11 lies in an axis 13 of the recess 2 of the function element 4, so that moving the gripper carriage 8 in the guide contour 11 causes twisting of the function element 4, without the axis 13 of the recess 2 of the function element 4 being withdrawn from a joining axis 13 (see FIG. 3). Twisting of the function element 4 thus takes place in the joining axis 13.

The pushing means 9 is configured such that the gripper means 7 shifts exclusively in x-direction thereby enforcing a predefined pressing-ion position of the function element 4 against the shaft 3, which can achieve an especially uniform cooling of the function elements 4 and thus an improved thermal joining seat.

The gripper carriage 8 is fixed relative to the support balcony 5 in z-direction, i.e. in vertical direction, wherein additionally also the gripper means 7 is fixed relative to the gripper carriage 8 in z-direction.

On a more close inspection of the gripper means 7, it can be recognised that this comprises two gripper jaws 14, 15, which allow holding the function element 4 to be fixed in a single or alternatively in a random rotary angle position. According to the first alternative the two gripper jaws 14, 15 may comprise an inner contour complementary to the outer contour of the function element to be fixed, thereby permitting a hold in a predefined rotary angle position.

Generally thermal joining of the function elements 4 having a recess 2, such as cams, balancing masses, gear and/or bearings, on the shaft 3 by means of the device 1 shown in FIG. 3 for producing the control shaft 10 is carried out as follows:

Initially the individual function elements 4 are placed into the support balconies 5 arranged vertically one above the other and at the same time they are aligned and fixed with respect to their rotary angle position. At this stage however, they still have a degree of freedom in x-direction and in y-direction, i.e. they are movably held in a horizontal plane, because the gripper means 7 is movably mounted on the gripper carriage 8. Subsequently a centring rod 20 is pushed from below through the individual recesses 2 of the function elements 4, until it makes contact with the shaft 3. During this process in particular a centring tip 21 of the centring rod 20 may push itself at least partially into the pipe-shaped shaft 3. The function elements 4 are heated for thermal joining, wherein additionally or alternatively the shaft 3 can be cooled. The shaft 3 is then inserted vertically from above by means of the movable gripper carriage 6 through the recesses 2 of the function elements 4, until an end position has been reached. Once this end position is reached, which also defines the later axial positions of the individual function elements 4 on the shaft 3, a temperature balance, which fixes the function elements 4 on the shaft 3 is awaited, and the control shaft 10 is removed.

With an advantageous further development of the method according to the invention the pushing means 9 shift the respective gripper means 7 and thus also the respective function elements 4 relative to the associated gripper carriage 8 in x-direction. In this way a predefined press-on position of the function elements 4 against the shaft 3 is enforced, which makes it possible to achieve a particularly uniform temperature balance and thus an improved thermal joining seat. As can be seen in particular in FIG. 3, during the same working step, i.e. directly prior to insertion of the shaft 3, a bearing frame 16 or a cylinder hood 17 with corresponding through-openings 18 can, of course, be additionally pushed over the function elements 4 such that an axis 19 of the through-openings 18 is in alignment with the axis 13 of the recesses 2 of the function elements 4.

While being pushed through the centring rod 21 can shift the function elements 4 in their x-direction and y-direction such that the axes 13 of the recesses 2 of the function elements 4 are aligned with the axis of the shaft 3. Alternatively it is feasible that the centring rod 21, shortly before insertion of the shaft 3 into the recesses 2 of the function elements 4, shifts these in their x-direction and y-direction such that the axes 13 of the recesses 2 of the function elements 4 are aligned with the axis of the shaft 3.

Following insertion of the shaft 3 and prior to temperature compensation the pushing means 9 may shift the respective gripper means 7 relative to the respectively associated gripper carriage 8 at least in x-direction.

Figure 2:
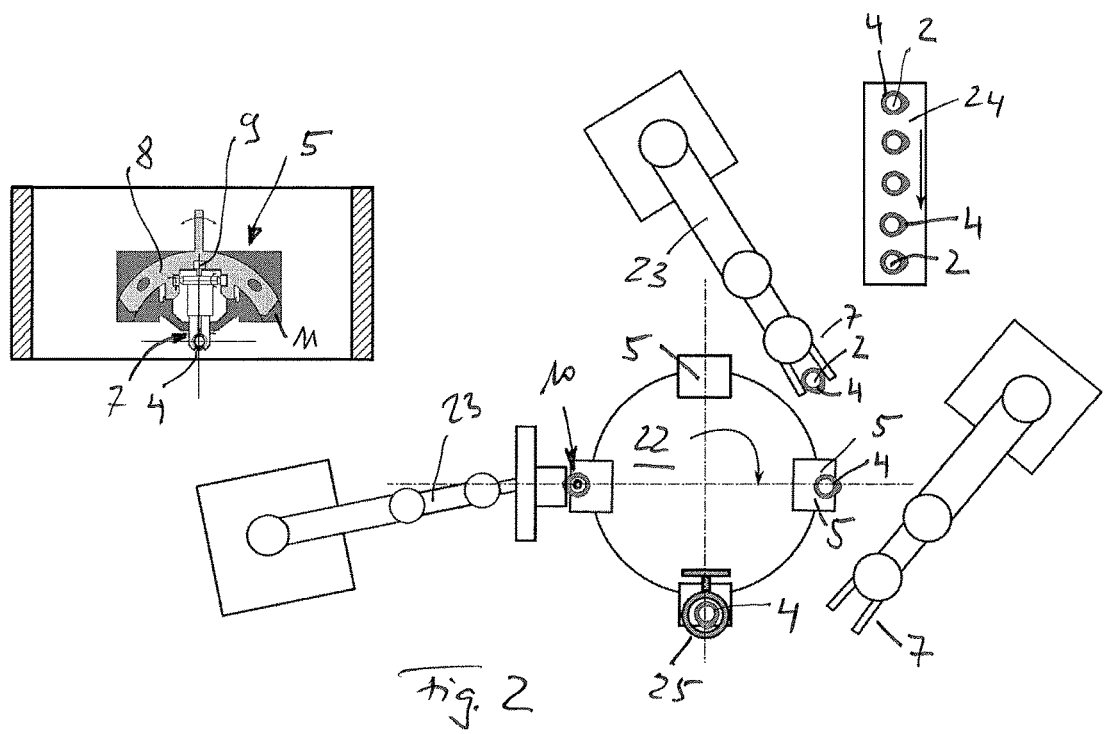
FIG. 2 shows a device according to the invention with a rotary table for different production stations.

The device 1 shown in FIG. 3 may of course be part of a group of devices with a rotary table 22 (see FIG. 2), in which using a robot 23, the individual function elements 4 are picked from a magazine 24 and placed into an associated support balcony. This can be done by different robots 23, wherein, of course, such a robot 23 is able to pick a number of, or even all of, the function elements 4 in one go. Subsequently the rotary table 22 is rotated and the function elements 4 are heated at a further station, for example by means of induction coils 25. At the last station (here at 9.00 o'clock) the shaft 3 is then joined and, following temperature compensation, the finished control shaft 10 is removed from the device 1.

Using the device 1 according to the invention and the method according to the invention it is possible to eliminate an extremely expensive and up-to-now necessary alignment and adjustment operation, since the individual function elements 4 in the device 1 at any rate still comprise a degree of freedom in a horizontal plane, via which at least certain manufacturing tolerances can be compensated for relatively easily. Due to the pushing means 9 provided according to the invention an unequivocal position between the respective function elements 4 and the associated shaft 3 can moreover be enforced during cooling or during temperature compensation, as a result of which a thermal joining seat can be achieved which as regards quality is distinctly improved.

The invention claimed is:

1. A device for positioning a number of function elements each having a recess for a shaft, in a predetermined angle position on the shaft, comprising:
   a plurality of support balconies arranged one above the other, each being destined for a function element;
   a movable guide carriage configured to enable the shaft to be pushed in from above through the recesses of the function elements;
   wherein the support balconies each comprises at least one gripper for respectively fixing one function element;
   wherein the at least one gripper is arranged on an associated gripper carriage and is adjustable in an x-direction and in a y-direction relative to the associated gripper carriage and the support balcony; and
   wherein the associated at least one gripper carriage is mounted on the support balcony so as to be rotatable about a z-axis.

2. The device according to claim 1, wherein the at least one gripper is mounted on the associated gripper carriage so as to be tiltable about a y-axis.

3. The device according to claim 1, wherein the z-axis is aligned in parallel to an axis of the movable guide carriage.

4. The device according to claim 1, further comprising at least one pusher configured to adjust the at least one gripper at least in the x-direction relative to the gripper carriage and the support balcony.

5. The device according to claim 1, further comprising a circular-segment-like guide contour in at least one support balcony, wherein a circle centre of the guide contour lies in an axis of the recess of the respective function element such that moving the gripper carriage in the guide contour causes twisting of the respective function element about the axis of the recess.

6. The device according to claim 4, wherein the at least one pusher is configured to shift the at least one gripper in the x-direction.

7. The device according to claim 1, wherein the gripper carriage is fixed relative to the support balcony in the z-direction.

8. The device according to claim 1, the gripper is fixed relative to the gripper carriage in the z-direction.

9. The device according to claim 1, wherein the at least one gripper comprises two gripper jaws to hold the function element in a single or a random rotary angle position.

10. The device according to claim 9, the two gripper jaws have an inner contour complementary to an outer contour of the respective function element.

11. The device according to claim 2, wherein the z-axis is aligned in parallel to an axis of the movable guide carriage.

12. The device according to claim 2, further comprising at least one pusher configured to adjust the at least one gripper at least in the x-direction relative to the gripper carriage and the support balcony.

13. The device according to claim 12, wherein the at least one pusher is configured to shift the at least one gripper in the x-direction.

14. The device according to claim 3, further comprising at least one pusher configured to adjust the at least one gripper at least in the x-direction relative to the gripper carriage and the support balcony.

15. The device according to claim 14, wherein the at least one pusher is configured to shift the at least one gripper in the x-direction.

16. A device for positioning a number of function elements, each having a recess for a shaft, in a predetermined angle position on the shaft, comprising:
   a plurality of support balconies arranged one above the other, each being destined for a function element;
   a movable guide carriage configured to push the shaft from above through the recesses of the function elements;
   wherein the support balconies each comprises at least one gripper for respectively fixing one function element, the at least one gripper including two gripper jaws having an inner countour complementary to an outer contour of the respective function element to hold the respective function element in a single or a random rotary angle position;
   wherein the at least one gripper is arranged on an associated gripper carriage and is adjustable in an x-direction and in a y-direction relative to the associated gripper carriage and the support balcony; and
   wherein the associated gripper carriage is mounted on the support balcony so as to be rotatable about a z-axis.

* * * * *